(12) United States Patent
Plona

(10) Patent No.: US 9,341,215 B2
(45) Date of Patent: May 17, 2016

(54) BEARING CAGE WITH A PERIPHERAL VIBRATION DAMPING RING

(71) Applicant: SNECMA, Paris (FR)

(72) Inventor: Daniel Georges Plona, Vulaines sur Seine (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/538,227

(22) Filed: Nov. 11, 2014

(65) Prior Publication Data

US 2015/0152918 A1    Jun. 4, 2015

(30) Foreign Application Priority Data

Nov. 29, 2013  (FR) ..................................... 13 61847

(51) Int. Cl.
| | |
|---|---|
| *F16C 33/46* | (2006.01) |
| *F16C 41/00* | (2006.01) |
| *F16C 19/52* | (2006.01) |
| *F16C 19/26* | (2006.01) |
| *F01D 25/16* | (2006.01) |

(52) U.S. Cl.
CPC ............. *F16C 33/46* (2013.01); *F16C 19/527* (2013.01); *F16C 33/4611* (2013.01); *F16C 33/4629* (2013.01); *F16C 41/004* (2013.01); *F01D 25/164* (2013.01); *F16C 19/26* (2013.01); *F16C 33/4658* (2013.01); *F16C 2240/30* (2013.01); *F16C 2360/23* (2013.01)

(58) Field of Classification Search
CPC .. F16C 33/3834; F16C 33/44; F16C 33/4611; F16C 33/56
See application file for complete search history.

(56) References Cited

U.S. PATENT DOCUMENTS

| | | | |
|---|---|---|---|
| 5,749,660 A | 5/1998 | Dusserre-Telmon et al. | |
| 7,121,729 B2* | 10/2006 | Davis | F16F 7/104 |
| | | | 384/523 |
| 8,303,192 B2* | 11/2012 | Yamada | F16C 33/3812 |
| | | | 384/576 |
| 8,622,622 B2* | 1/2014 | Solfrank | F16C 33/3806 |
| | | | 384/462 |
| 2002/0186911 A1* | 12/2002 | Van Dine | F16C 19/14 |
| | | | 384/523 |
| 2012/0002911 A1* | 1/2012 | Gebauer | F16C 19/36 |
| | | | 384/572 |
| 2015/0043863 A1* | 2/2015 | Beck | F16C 43/04 |
| | | | 384/573 |

FOREIGN PATENT DOCUMENTS

| | | |
|---|---|---|
| DE | 37 09 673 A1 | 10/1988 |
| DE | 10 2006 045 436 A1 | 3/2008 |
| DE | 10 2011 089 078 A1 | 6/2013 |
| EP | 0 769 631 A1 | 4/1997 |

(Continued)

OTHER PUBLICATIONS

French Preliminary Search Report issued Jul. 24, 2014, in French Application No. 13 61847 filed Nov. 29, 2013 (with English Translation of Categories of Cited Documents).

(Continued)

*Primary Examiner* — Thomas R. Hannon
(74) *Attorney, Agent, or Firm* — Oblon, McClelland, Maier & Neustadt, L.L.P

(57) ABSTRACT

An annular bearing cage for a roller bearing of a turbine machine rotating shaft is provided. The bearing cage includes a vibration damping ring corresponding to deformation modes of the bearing cage, and at least one external rim. The external rim includes an at least partially annular housing that extends around a central axis of the bearing cage. The damping ring is located in the housing.

11 Claims, 2 Drawing Sheets

(56) References Cited

FOREIGN PATENT DOCUMENTS

| | | |
|---|---|---|
| FR | 2 675 554 | 10/1992 |
| FR | 2 675 554 A1 | 10/1992 |
| JP | 2011-132983 | 7/2011 |
| JP | 2011-132983 A | 7/2011 |
| WO | WO 2008/040290 A1 | 4/2008 |
| WO | WO 2013/092217 A1 | 6/2013 |

OTHER PUBLICATIONS

French Preliminary Search Report issued on Jul. 24, 2014 in French Application No. 1361847 filed Nov. 29, 2013.

* cited by examiner

BEARING CAGE WITH A PERIPHERAL VIBRATION DAMPING RING

TECHNICAL FIELD

The invention relates to the technical field of bearing cages for rotating shafts and particularly turbine machine rotating shafts. More precisely, the invention relates to a bearing cage comprising at least one means of damping vibrations of the bearing cage.

STATE OF PRIOR ART

Rotating shafts of turbine machines are supported and guided in rotation by bearing blocks fitted with roller bearings. Each of these roller bearings comprises a plurality of rolling elements that may have different natures, for example they may balls, rollers or even needles.

In a known manner, a turbine machine roller bearing like that disclosed in Snecma patent application EP 0 769 631 comprises an inner ring, an outer ring and a bearing cage comprising one or two rails, housed between the outer ring and the inner ring. The rolling elements are then located inside the bearing cage between the cage races that will keep them at a spacing from each other.

Roller bearings used for rotating shafts of turbine machines, and particularly for the aeronautical industry, have to resist particularly high constraints in terms of service life, rotation speeds and low power dissipation.

Outer vibration excitations may potentially be applied to this bearing cage, particularly related to the environment or internally, for example related to operation and the inner dynamics of the roller bearing. When these excitation frequencies are in phase with deformation modes of the cage, they can mechanically deform the cage during operation and prematurely damage it by mechanical fatigue or by inducing distortions that for example may prevent correct centering.

Its working cross-section and principally the cross-section of the rails can be increased, to prevent the bearing cage from deforming excessively. Nevertheless, optimization of the rails is limited by the need to provide means for evacuating lubrication oil from the roller bearing.

One way of circumventing this limitation is to increase the size of the rolling elements. However, the reliability of the roller bearing under operation at low load may then be degraded.

When cage deformation modes cannot be placed outside excitation frequencies applied to the roller bearing, there is a strong risk that the bearing will deteriorate prematurely. In this case, one possible solution is to provide the cage with a means of damping vibrations caused by excitation frequencies. Nevertheless, vibration damping means making used of known designs are not fully satisfactory.

PRESENTATION OF THE INVENTION

The invention aims to at least partially solve problems encountered in solutions in prior art.

In this respect, the purpose of the invention is an annular bearing cage for a roller bearing of a turbine machine rotating shaft, the bearing cage comprising a vibration damping ring corresponding to deformation modes of the bearing cage, and the bearing cage comprising at least one external rim comprising an at least partially annular housing extending around a central axis of the bearing cage, the damping ring being located in the housing.

The damping ring damps vibrations generated by mechanical deformation of the bearing cage during operation of the roller bearing in which the roller bearing cage is integrated.

In particular, the housing has a sufficiently large mechanical contact area with the damping ring to keep the damping ring in position and to efficiently transmit mechanical forces from the roller bearing cage to the damping ring which then dissipates this energy. The housing is designed particularly to cause rotation of the damping ring with the bearing cage around the central axis of the bearing cage.

For example, relative micro-movements may occur in the damping ring in its housing, and these micro-movements can create mechanical damping of deformation modes of the cage as a result of the coefficient of friction between the ring and the cage. Thus, cage deformation modes are absorbed and the deformation of the cage is minimized.

However, the amplitudes of micro-movements of the damping ring are almost negligible compared with the circumferential length of the housing. Consequently, the damping ring can be considered as being practically fixed in rotation with the housing.

The invention may optionally comprise one or several of the following characteristics that may or may not be combined together.

Advantageously, the vibration damping ring and the external rim are configured to dampen vibrations in natural mechanical deformation modes of the bearing cage. In this respect, the damping ring is preferably configured to dampen the first harmonics of natural mechanical deformation modes of the bearing cage.

More generally, the damping ring is configured to at least partly dampen the main modes that might cause deterioration of the cage and the roller bearing.

According to another characteristic, the housing holds the damping ring in contact with an outer lateral surface of the bearing cage.

As a variant, the housing could be located particularly on another outer surface of the bearing cage.

According to one particular embodiment, the housing is a retaining groove for the damping ring. In this case, the damping ring is located in the groove, preferably in mechanical contact with the bottom of the groove.

In an alternative configuration, the housing may for example be a cavity, completely or almost completely closed around the damping ring.

According to one advantageous embodiment, the external rim comprises an outer retaining shoulder with a hook shaped cross-section.

The damping ring may be a single piece or it may be separated into sectors. The ring is preferably a single piece, being split so as to create two ends with a non-zero spacing between them. In particular, the ring is split at its ends to facilitate its assembly on the bearing cage.

The damping ring preferably extends over an angle equal to between 350° and 360° along the bearing cage. According to another advantageous embodiment, the external rim forms a guide rail for at least one rolling element of the roller bearing.

In particular, the bearing cage may be configured to maintain a space between each of a plurality of rolling elements between the guide rails. These rolling elements may have various natures, for example balls, rollers or even needles.

According to another particular embodiment, the bearing cage comprises a main body comprising the external rim, the main body being made from a metallic material and particularly steel, the damping ring being made from a metallic material with a mechanical strength comparable with the mechanical strength of the main body. The damping ring is preferably made from cast iron or steel.

According to another particular embodiment, the bearing cage comprises a pair of damping rings and a pair of external rims each comprising an at least partially annular housing around the central axis in which one of the damping rings is located, the damping rings and the outer rims of each pair being arranged approximately symmetrically by plane symmetry relative to a single median plane of the bearing cage.

In particular, the damping ring is kept approximately fixed in rotation with the bearing cage, by rotation about the central axis.

The invention also relates to a roller bearing for a rotating shaft of a turbine machine comprising a bearing cage as defined above.

The invention is also related to a turbine machine bearing block, the bearing block comprising a roller bearing like that defined above.

The invention also relates to a turbine machine rotor, the rotor comprising a turbine machine bearing block like that defined above.

The invention also relates to a turbine machine with at least one roller bearing, a bearing block and/or a rotor as defined above.

Finally, the invention relates to a method of fabricating an annular bearing cage as defined above, the method including a step to determine natural mechanical deformation modes of the bearing cage without a damping ring, step during which a damping ring configured to dampen vibrations generated by the roller bearing is fitted in the housing, such that the housing is designed to cause the damping ring to move in rotation around the central axis of the bearing cage.

The damping ring is then fixed in rotation with the bearing cage, except particularly for micro-displacements of the damping ring in its housing.

BRIEF DESCRIPTION OF THE DRAWINGS

This invention will be better understood after reading the description of example embodiments given purely for information and in no way limitative with reference to the appended drawings in which.

DETAILED PRESENTATION OF PARTICULAR EMBODIMENTS

Identical, similar or equivalent parts of the different figures have the same numerical references so as to facilitate comparison between one figure and the others.

Figure 1:
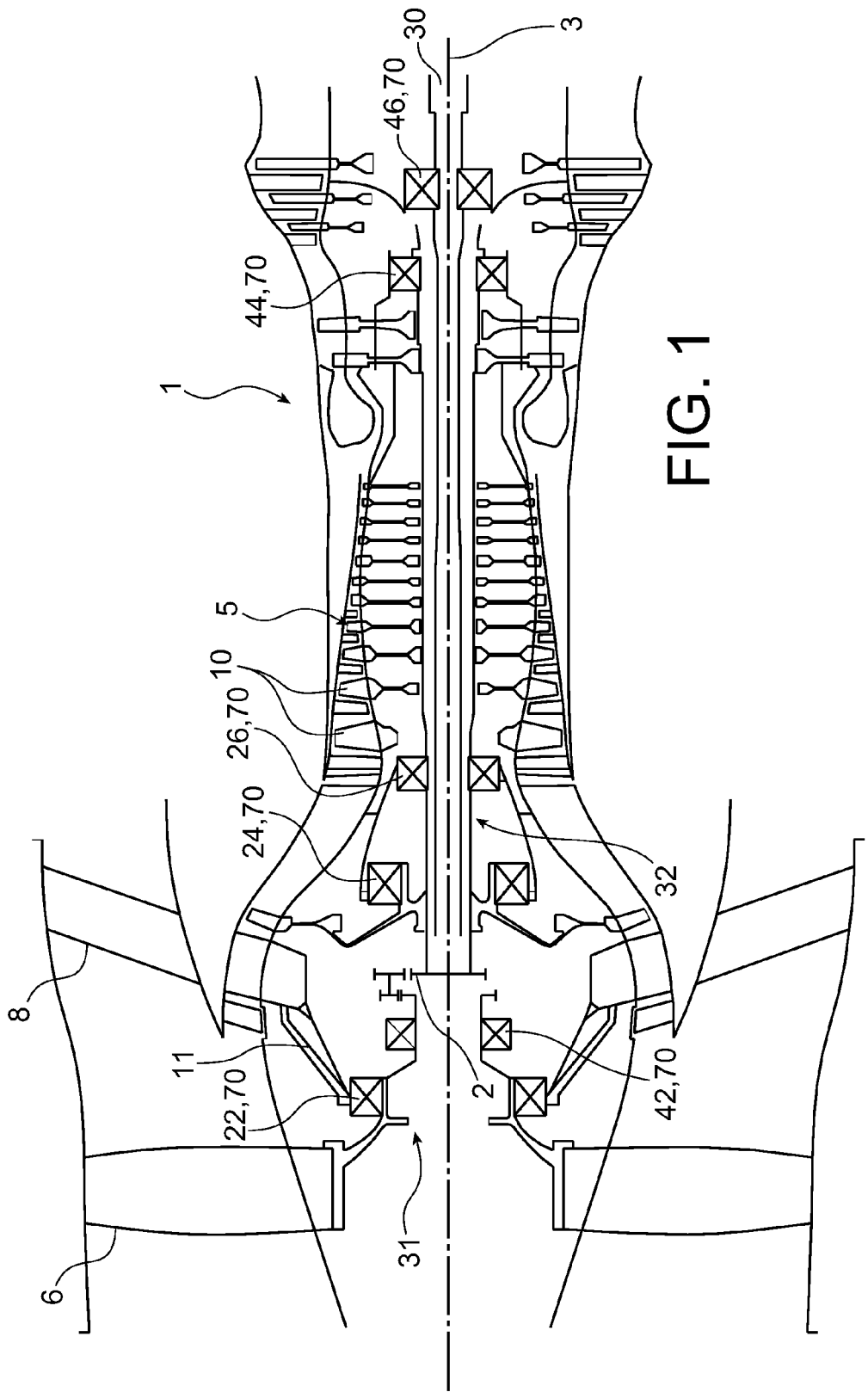
FIG. 1 shows a diagrammatic longitudinal sectional view of a twin-spool turbine machine for an aircraft.

FIG. 1 diagrammatically shows a twin-spool turbine machine 1 according to one embodiment of the invention. The turbine machine 1 comprises a rotating shaft 30 of the turbine machine 1 moving around the main longitudinal axis 3 of the turbine machine 1.

The shaft 30 includes particularly a coaxial forward part 31 and aft part 32. The forward part 31 and the aft part 32 are connected by a reduction gear 2 shown very diagrammatically. They support the fan blades 6, the guide vanes 8 and compressor blades 10. The shaft 30, the mobile blades of the fan 6 and the compressor 10 and the reduction gear to which they are mechanically connected, form part of the rotor 5 of the turbine machine 1.

The forward shaft 31 is usually supported from the upstream to the downstream direction by a ball bearing 22 and by a roller bearing 42 placed in the zone of the reduction gear 2. The aft part 32 of the shaft 30 is much longer and in this case is supported from the upstream to downstream direction firstly by a pair of ball bearings 24 and 26 configured to resist high axial loads and then by a pair of roller bearings 44 and 46 configured to resist high radial loads. Each of these six roller bearings 22, 24, 26, 42, 44, 46 forms part of a bearing block of the turbine machine 1 that is usually firmly fixed to a casing of the stator of the turbine machine 1 by a support means 11.

Figure 2:
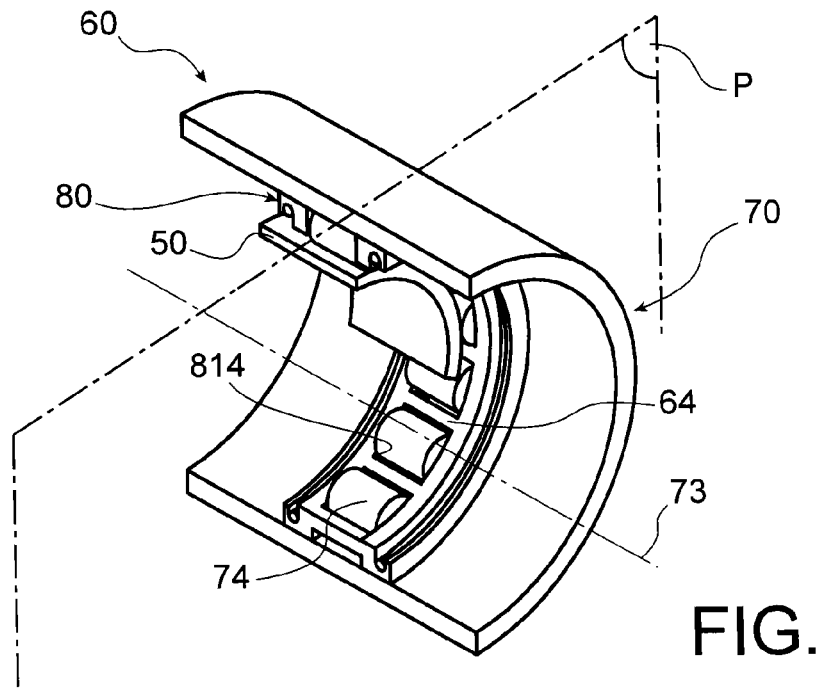
FIG. 2 is a partial perspective sectional view of a roller bearing according to a first embodiment of the invention.
Figure 3:
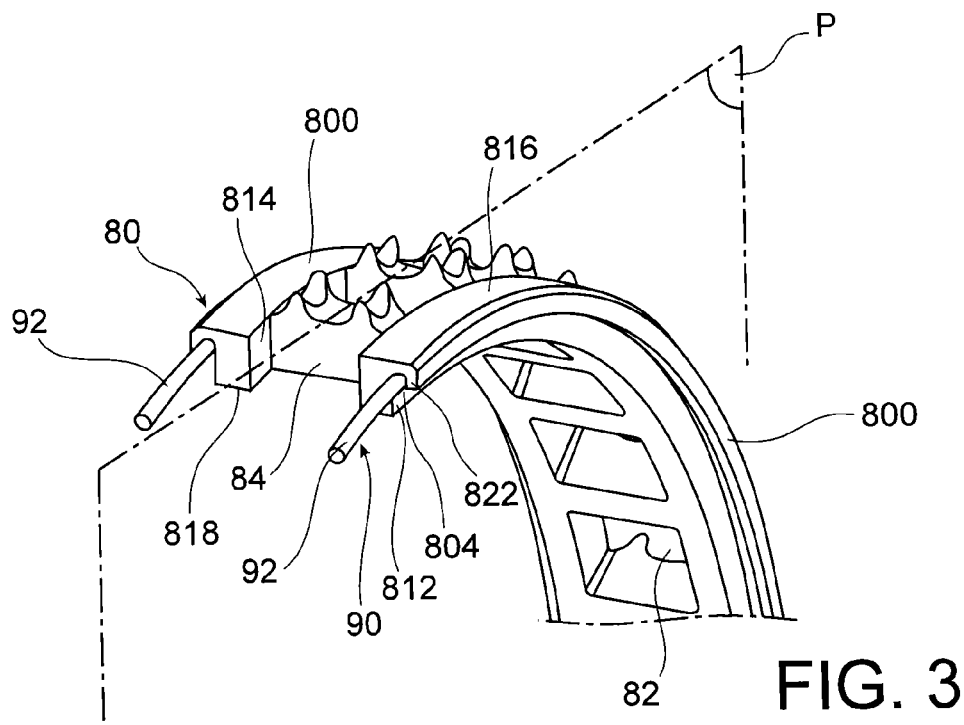
FIG. 3 is a partial view of the bearing cage in FIG. 2.

Each of the six roller bearings 22, 24, 26, 42, 44, 46 may be a roller bearing with a configuration identical to the configuration of the roller bearing 70 shown in FIGS. 2 and 3. The roller bearing 70 may also be mounted on a low pressure turbine rotating shaft (not shown) or possibly on a turbine machine shaft configured to rotate at high rotation speeds, such as a high pressure turbine shaft (not shown).

With reference to FIG. 2 and FIG. 3, the figures show a roller bearing 70 of a rotating shaft 30, 31, 32 of the turbine machine 1, according to a first embodiment of the invention. The roller bearing 70 comprises an outer ring 60, an inner ring 50 and rolling elements 74.

The rolling elements 74 are usually guided in displacement in at least one bearing race 64 formed on the outer ring 60 and/or the inner ring 50.

The roller bearing 70 also comprises an annular bearing cage 80 located between the inner ring 50 and the outer ring 60, to keep a spacing between the rolling elements 74 during operation. The roller bearing 70 is approximately symmetric in revolution about the central axis 73 of the bearing cage 80. Furthermore, the roller bearing 70 is approximately symmetrical by plane symmetry about a median plane "P". The plane "P" is approximately orthogonal to the central axis 73.

Compartments 82 delimited by walls 84 controlling the space of rolling elements 74 pass through the bearing cage 80. The bearing cage 80 comprises an external rim 800 on each side of the compartments 82 that acts as a guide rail for the rolling elements 74. The walls 84 that control the space between rolling elements 74 are made particularly with the same material as the external rims 800 so as to form a main body of the bearing ring 80 that can resist the high operating stresses of the roller bearing 70.

To achieve this, the main body of the bearing cage 80 is made from a metallic material and particularly steel, in a known manner. Frequently used metals or alloys of them are preferred particularly for their relatively high thermal resistance and mechanical strength. The strength of the bearing cage 80 can be improved even further by making the main body of the bearing ring 80 generally as a single piece. In this case, the compartments 82 may for example be made by drilling or by broaching.

Preferably, the walls 84 separating the rolling elements 74 and the two external rims 800 extend along the entire bearing cage 80 around the central axis 73, each external rim 800 being located at the lateral periphery of the bearing cage 80.

An external rim 800 comprises an inner sidewall 814 delimiting the guide rail of the rolling elements 74 and an outer sidewall 812 opposite the inner sidewall 814. The inner sidewall 814 and the outer sidewall 812 are delimited by a radially lower wall 818 facing the inner ring 50 and a radially higher wall 816 facing the outer ring 60.

The bearing cage 80 can deform mechanically during operation, which can reduce its service life. However, the bearing cage 80 is preferably configured such that the first natural deformation mode of the bearing cage 80 is never reached, particularly due to the stiffness of the bearing cage 80.

In order to further limit the effect of mechanical vibrations on the roller bearing 70, the bearing cage 80 comprises at least one vibration damping ring 92 located in a housing 804 provided on one of the outer rims 800. The damping ring 92 is preferably also capable of damping vibrations of at least one natural mechanical deformation mode of the bearing cage 80 that is determined when there is no damping ring 92 present. In practice, since the roller bearing 70 is symmetrical about its median plane "P", the bearing cage 80 comprises at least one pair of damping rings 92 each located in a housing 804 provided on an external rim 800. The damping rings 92 mounted on each external rim 800 are preferably practically identical. Each damping ring 92 extends over at least an angular part along the annular external rim 800, preferably over 360° around the bearing cage 80.

With reference to FIG. 3, the housing 804 enables the damping ring 92 to hold itself in place due to its elastic return in contact with the outer lateral surface 812 of the bearing cage 80. In this example embodiment, the housing 804 is in the shape of a retaining groove for the damping ring 92 along the outer lateral surface 812. The external rim 800 has an outer retaining shoulder 822 of the damping ring 92 formed by an outer edge of the retaining groove of the damping ring 92. This outer retaining shoulder 822 has a hook-shaped cross-section, in other words in a section plane that contains the central axis 73 and is therefore perpendicular to the median plane "P". The damping ring 92 thus housed in the retaining groove, does not rub against the inner ring 50 or the outer ring 60. Furthermore, the housing 804 is facing the inner ring 50, such that during use, the centrifugal force generated by rotation of the bearing cage 80 will not tend to make the damping ring 92 escape from the retaining groove.

In general, the damping ring 92 is housed in the external rim 800 so that it is fixed in rotation with the bearing cage 80. Therefore, there is practically no relative displacement between the damping ring 92 and the bearing cage 80. More precisely, there can only be a very limited displacement of the damping ring 92 by relative micro-movements in its housing 804, during deformation of the bearing cage 80 in its deformation modes. The dissipation of friction energy between the ring 92 and the cage 80 during these relative micro-movements creates mechanical damping of deformation modes of the bearing cage 80.

Since the damping ring 92 is held in contact with the bearing cage 80 by the external rim 800, the damping ring 92 is not in direct mechanical contact with the rolling elements 74. Consequently, the damping ring 92 can damp mechanical vibrations transmitted by the main body of the bearing cage 80 without reducing the reliability of the roller bearing 70.

Furthermore, evacuation of lubrication oil from the roller bearing 70 is not disturbed by the presence of the damping ring 92, because the damping ring is housed in the external rim 800. More precisely, the lubrication oil is even evacuated better because the damping ring 92 is fairly distant from at least one bearing race 64.

In the example shown in FIG. 3, the damping ring 92 is made in a single piece but it could also be formed from several sectors of successive elementary rings along the retaining groove of the damping ring 92. The single piece damping ring is preferably split so as to form two ends and thus to facilitate its assembly in the housing 804 as described below. In this configuration, the end parts of the damping ring 92 located close to the slit in the damping ring 92 preferably have a radius of curvature, approximately equal to or even slightly less than the radius of curvature of the housing 804 so that these end parts remain facing each other when the damping ring 92 is fitted in the housing 804. In this way, it is possible in particularly to prevent solid particles from being deposited between the bottom of the groove 804 and the damping ring 92, which would cause an unwanted modification of the coefficient of friction between the damping ring 92 and the cage, and possibly premature wear of the bearing cage 80.

Advantageously, the distal part of the damping ring 92 opposite the end parts then has a radius of curvature when at rest larger than the radius of curvature of the housing 804, so as to facilitate retaining of the damping ring 92 in the housing 804 by elastic return of the ring. The damping ring 92 may be composed of a helical spring, advantageously with touching turns to optimize the coefficient of friction between the ring and the cage.

The damping ring 92 may for example be made of cast iron or steel. More generally, the damping ring 92 is made from a material with a mechanical strength similar to the mechanical strength of the main body of the cage that it is required to damp.

In manufacturing a bearing cage 80 with vibration damping means 90 according to the invention, the natural mechanical deformation modes of the bearing cage 80 are determined in advance when there are no vibration damping means present. At least one damping ring 92 like that described above is subsequently installed in the housing 804 in the external rim 800 such that the damping ring 92 is fixed particularly in rotation with the bearing cage 80. The damping ring 92 can displace with friction in its housing 804 and can therefore rotate with micro-movements relative to the bearing cage 80 during operation.

A clearance will be provided to split the damping ring 92 and create a non-zero space between the two ends of the damping ring 92 thus formed, so that the damping ring 92 can be assembled in the bearing cage 80. The ring 92 can then be reclosed when the assembly is made by making its two ends join together, so that they can be inserted from below in the outer retaining shoulder 822. Once the damping ring 92 has been put into place in the housing 804, the ring 92 extends around an angle preferably between 350° and 360° along the bearing cage 80. The angle is usually less than 360°, which means that a spacing remains between the two ends of the ring 92 in place. This spacing implies a discontinuity in the angular distribution of the mass of the ring 92. The resulting unbalance may be acceptable because it is within balancing tolerances of the bearing cage 80, or the unbalance will be compensated particularly by making a ring section 92 with a variable cross-section. For example, a smaller section could be provided for the ring 92 on the side diametrically opposite the two ends, so as to locally reduce the mass per unit length of the ring 92.

Obviously, those skilled in the art could make various modifications to the invention as described above without going outside the framework of the presentation of the invention. The roller bearing according to the invention may for example include additional means of damping roller bearing vibrations.

The invention claimed is:

1. Bearing cage for a roller bearing of a turbine machine rotating shaft, including:
    a vibration damping ring corresponding to deformation modes of the bearing cage,
    at least one external rim comprising:
        an at least partially annular housing extending around a central axis of the bearing cage,
    in which the damping ring is located in the housing.

2. Bearing cage according to claim 1, in which the housing holds the damping ring in contact with an outer lateral surface of the bearing cage.

3. Bearing cage according to claim 1, in which the housing is a retaining groove for the damping ring.

4. Bearing cage according to claim 1, in which the external rim comprises an outer retaining shoulder with a hook shaped cross-section.

5. Bearing cage according to claim 1, in which the damping ring is a single piece,
- in which the damping ring is split so as to create two ends with a non-zero spacing between them, and
- in which the damping ring extends over an angle of between 350° and 360° along the bearing cage.

6. Bearing cage according to claim 1, in which the external rim forms a guide rail for at least one rolling element of the roller bearing.

7. Bearing cage according to claim 1, including a main body comprising the external rim,
- in which the main body is made from a metallic material, and
- in which the damping ring is made from a metallic material with a mechanical strength comparable with the mechanical strength of said main body.

8. Bearing cage according to claim 7, in which the main body and the damping ring are made from steel.

9. Bearing cage according to claim 1, comprising:
- a pair of damping rings, and
- a pair of external rims each comprising:
  - an at least partially annular housing around the central axis, in which one of the damping rings of the pair of damping rings is located in the housing, in which the damping rings and the external rims of each pair are arranged approximately symmetrically by plane symmetry relative to a single median plane of the bearing cage.

10. Roller bearing for a turbine machine rotating shaft, comprising the bearing cage according to claim 1.

11. Turbine machine comprising at least one roller bearing according to claim 10.

* * * * *